Sept. 8, 1959 V. VON KROGH SUNDT 2,902,873
MACHINE TOOL HEADSTOCK CONTROL MECHANISM
Filed Oct. 29, 1956 7 Sheets-Sheet 1

FIG. 1

INVENTOR.
VIGO VON KROGH SUNDT
BY
Andrus & Scealer
Attorneys

FIG. 3

INVENTOR.
VIGO VON KROGH SUNDT

Sept. 8, 1959   V. VON KROGH SUNDT   2,902,873
MACHINE TOOL HEADSTOCK CONTROL MECHANISM
Filed Oct. 29, 1956   7 Sheets-Sheet 7

INVENTOR.
VIGO VON KROGH SUNDT
BY
Attorneys

United States Patent Office 2,902,873
Patented Sept. 8, 1959

2,902,873

MACHINE TOOL HEADSTOCK CONTROL MECHANISM

Vigo von Krogh Sundt, Madison, Wis., assignor to Gisholt Machine Company, Madison, Wis., a corporation of Wisconsin Application October 29, 1956, Serial No. 618,817

23 Claims. (Cl. 74—364)

This invention relates to a machine tool headstock control mechanism, and more particularly to a hydraulic control system for the headstock of a lathe or the like.

The invention contemplates a novel headstock mechanism utilizing a plurality of hydraulic valves for selectively operating the various clutches, gears and brake for control of the lathe spindle. The mechanism is highly flexible and provides a plurality of forward and reverse spindle speeds, a manual spindle rotation control, a spindle inching mechanism, a substantially automatic hydraulic transmission gear shift control, a governor to safeguard against premature functions in the system and other novel features described hereinafter.

The accompanying drawings illustrate the best mode presently contemplated by the inventor for carrying out the invention.

Figure 1:
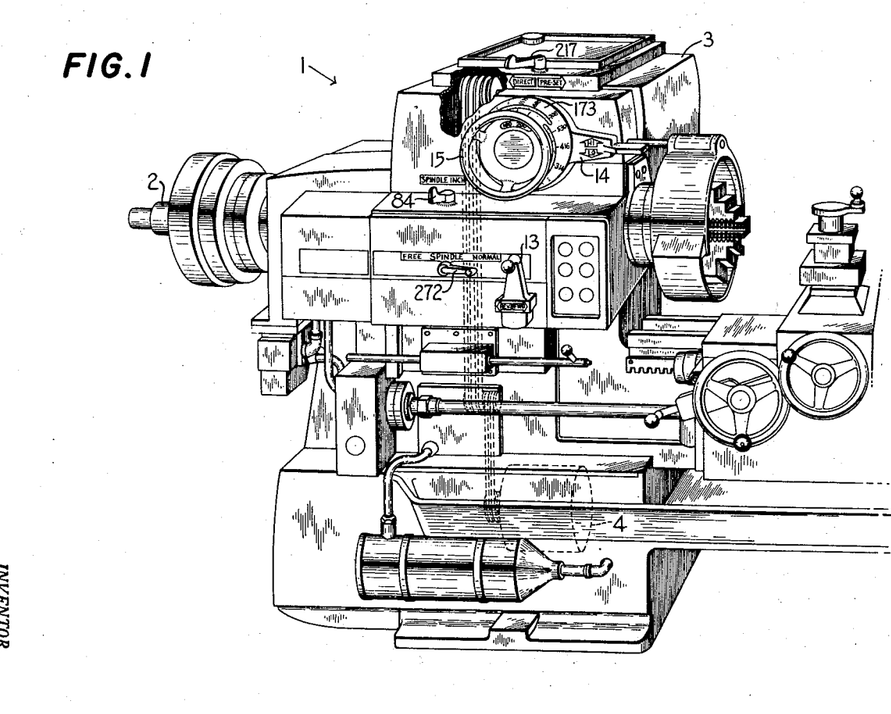
Figure 1 is a perspective view of a lathe headstock utilizing the invention.

As shown in the drawings, the invention may be utilized in a lathe 1 having a spindle 2 for supporting and rotating the work and which is driven by mechanism within a headstock 3 from a suitable source of power such as motor 4 mounted on the base of the lathe.

The mechanism within the housing of headstock 3 comprises, in general, a forward drive clutch 5, a reverse drive clutch 6, a high speed drive clutch 7, a low speed drive clutch 8 and three double gear shifter transmissions, designated as 9, 10 and 11 for driving spindle 2 at selectively different speeds. A brake 12 is mounted on spindle 2 and is actuated by fluid pressure to secure the same against rotation when the drive is in neutral.

The forward and reverse clutches 5 and 6 are connected between motor 4 and spindle 2 and are actuated hydraulically by fluid pressure in a manner to be described by a lever 13 mounted on the front of the headstock housing. Similarly, the high and low speed clutches 7 and 8 are connected between motor 4 and spindle 2 and are actuated by a trip lever 14 and by a handwheel 15 mounted on the housing. The gear shifter transmissions 9, 10 and 11 are controlled in a manner to be described by handwheel 15 which is manually operable.

Figure 2:
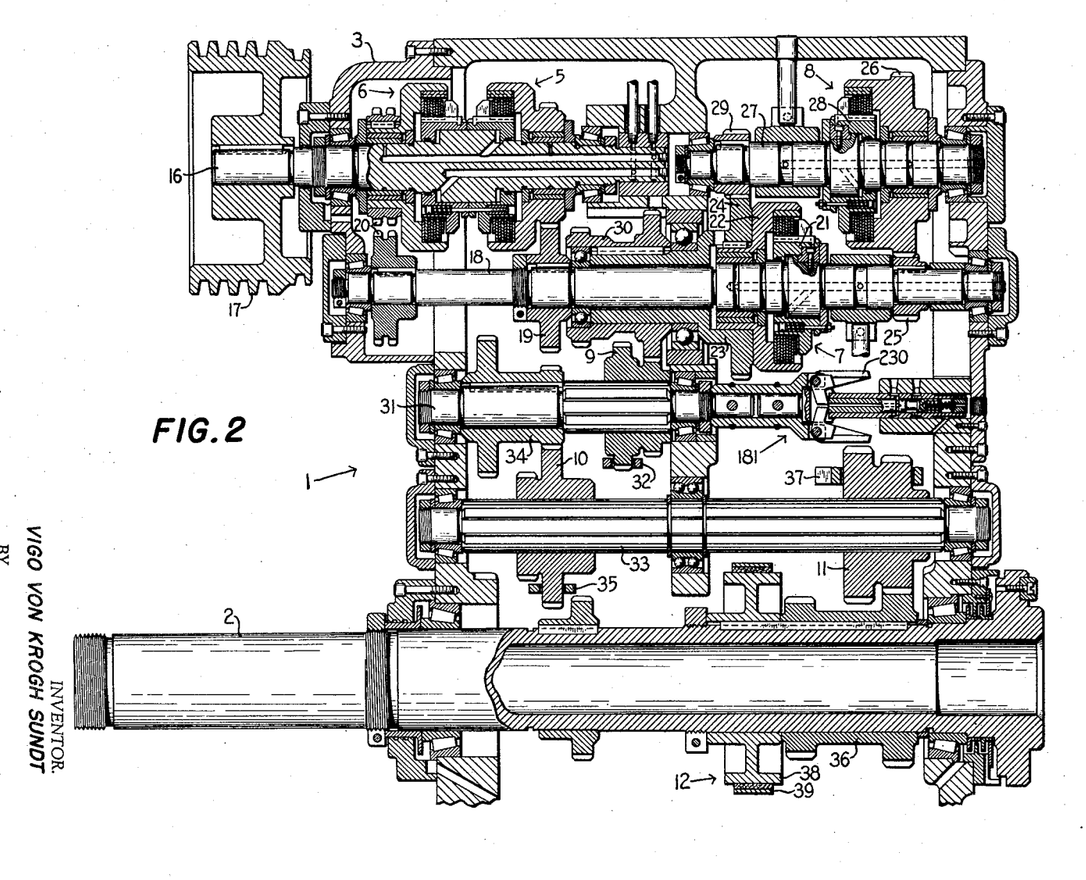
Fig. 2 is a developed longitudinal section of the headstock and showing the clutches and the brake mechanism.

The arrangement and detail construction of the clutches and gears in the headstock is relatively unimportant. As shown in Fig. 2, the drive shaft 16 is driven by an external pulley 17 from motor 4, and has the forward clutch 5 and reverse clutch 6 mounted thereon. Forward clutch 5 drives a shaft 18 in one direction through suitable gearing 19, while reverse clutch 6 drives shaft 18 in the opposite direction through suitable chain and sprocket gears 20. The clutches 5 and 6 are operated alternatively with a neutral position in which neither clutch is engaged.

The rotatably fixed member 21 of high speed clutch 7 is keyed to shaft 18, while the floating member 22 of clutch 7 is mounted on suitable bearings on shaft 18 and may rotate independently thereof. The rearward portion of member 22 is mounted within the forward portion of a sleeve 23 and is keyed thereto. Sleeve 23 has a gear 24 on its forward end and extends rearwardly from member 22 and is floatingly mounted on shaft 18. Engagement of clutch 7 will drive floating member 22 and sleeve 23 at the same speed and in the same direction as shaft 18.

A gear 25 is keyed to shaft 18 and engages the floating gear portion 26 of low speed slutch 8 mounted on a shaft 27. Shaft 27 is shown as mounted axially of drive shaft 16 and has the fixed member 28 of clutch 8 keyed thereto. Engagement of clutch 8 will rotate shaft 27 and drive gear 24 and sleeve 23 through a gear 29 keyed to shaft 27. The ratio of gear 25 to gear 26 and gear 29 to gear 24 is such as to establish a substantial reduction in speed of rotation of sleeve 23 when low clutch 8 is engaged relative to the speed of rotation of the sleeve when high speed clutch 7 is engaged.

The clutches 7 and 8 are operated alternatively to effect driving of sleeve 23 at either a high or low speed.

Sleeve 23 is provided with an extension 30 having a pair of concentrically mounted keyed gears of different size which are selectively engaged by the gears on double gear shifter transmission 9. Transmission 9 is mounted on the splined central portion of a shaft 31 and drives shaft 31 by meshing with the gears on extension 30. Shifter transmission 9 may be moved along the splined portion of shaft 31, to effect meshing of different gears, by means of a shifter shoe 32 which engages one of the gears thereon. Operation of shifter shoe 32 will be described more fully hereinafter.

Double gear shifter transmission 10 is mounted on a rotatable splined shaft 33 and is adapted to engage one of a pair of gears on a gear member 34 mounted rearwardly on shaft 31. Transmission 10 may be shifted along shaft 33 to effect meshing with one of the pair of gears on member 34 by means of a shifter shoe 35 which engages one of the pair in a manner to be described hereinafter. Rotation of shaft 31 is thus transmitted via gear member 34 and transmission 10 to shaft 33.

Double gear shifter transmission 11 is mounted on the forward portion of shaft 33 and is adapted to engage one of a pair of gears on a gear member 36 mounted forwardly on spindle 2 within headstock 3. Transmission 11 may be shifted along shaft 33 to effect meshing with one of the pair of gears on member 36 by means of a shifter shoe 37 which engages one of the pair in a manner to be described hereinafter. Rotation of shaft 33 is thus transmitted via transmission 11 and gear member 36 to spindle 2.

Spindle 2 is mounted in suitable bearings in the headstock casing and carries the brake 12 which comprises a brake drum 38 encircled by a brake band 39. Brake band 39 is tightened upon drum 38 by means of a piston 40 mounted in a power cylinder 41, and is loosened upon drum 38 by means of a spring 42 which opposes the movement of the piston under the influence of fluid pressure in the cylinder.

As best seen in Figs. 3, 4, 5 and 6, of the drawings, the hydraulic control mechanism for the headstock 3 includes a pump 43 which supplies oil or other hydraulic fluid under constant pressure through a line 44 to a plurality of selected valves, to be described hereinafter. A reservoir or sump 45 is disposed within headstock 3 and supplies fluid to pump 43 through a line 46. Sump 45 receives fluid from the drain ports of certain selected valves either through a line 47 or by the fluid falling down to the sump directly from the valve.

Hereinafter, when it is stated that a certain valve port receives fluid under constant pressure, it will be clear that the fluid is supplied through line 44 from pump 43. Likewise, when it is stated that a certain valve port is connected to drain, it will be clear that the fluid in the port will flow to sump 45 either through line 47 or by direct gravity fall through the headstock.

The hydraulic control mechanism for operating forward and reverse clutches 5 and 6 and brake 12 includes, in general: a forward and reverse pilot valve 48, a pressure regulator pilot valve 49, a clutch control valve 50, a free spindle valve 51, a brake pilot valve 52 and an inching valve 53.

Figure 4:
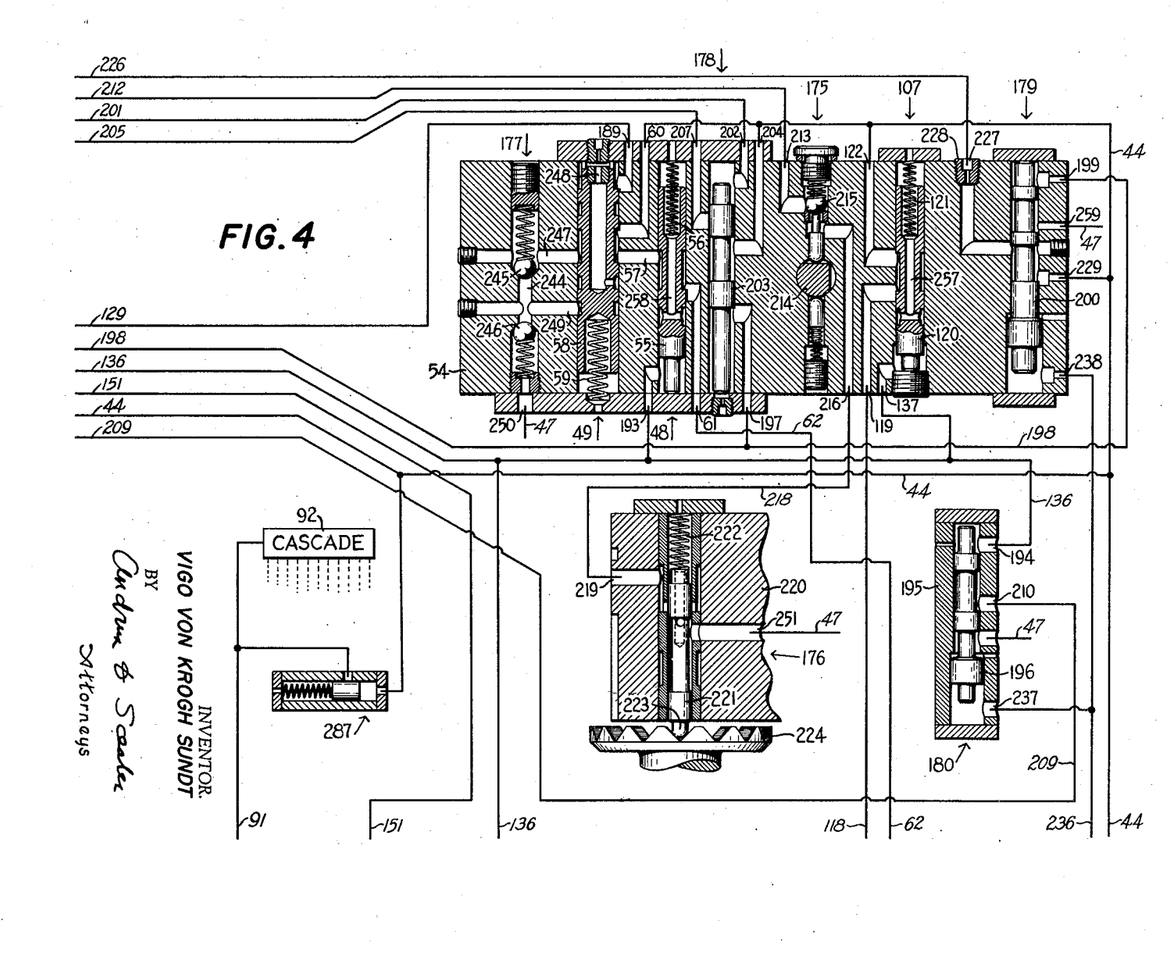
Fig. 4 is a diagrammatic view of the right upper portion of the hydraulic system.

Forward and reverse pilot valve 48 is disposed in a valve housing 54 and comprises a spool-type piston 55 adapted to reciprocate within the housing and normally biased in a downward position by a spring 56, as shown in Fig. 4.

A port 57 in housing 54 connects a centrally disposed circumferential groove in piston 55 with a centrally disposed circumferential groove in the spool-type piston 58 of pressure regulator pilot valve 49, also disposed in housing 54. Piston 58 is adapted to reciprocate in housing 54, and is normally biased upwardly by a spring 59.

A port 60 in housing 54 receives fluid under constant pressure and carries it to the groove in piston 58, the fluid passing hence through port 57 to the groove in piston 55. The fluid passes from valve 48 through a port 61 in housing 54, and then through a line 62 and into port 63 of clutch control valve 50.

Valve 50 selectively conducts fluid under normally constant pressure from pump 43 to brake 12 and clutches 5 and 6, and comprises a spool-type valve stem 64 disposed to reciprocate within a suitable sleeve or housing 65. The right end portion of valve stem 64 extends beyond housing 65 and is secured to forward-reverse lever 13.

The left end portion of valve stem 64 extends outwardly beyond housing 65 to adjacent a high speed reversing safety lock valve 66, the functioning and purpose of which will be described hereinafter.

Figure 6:
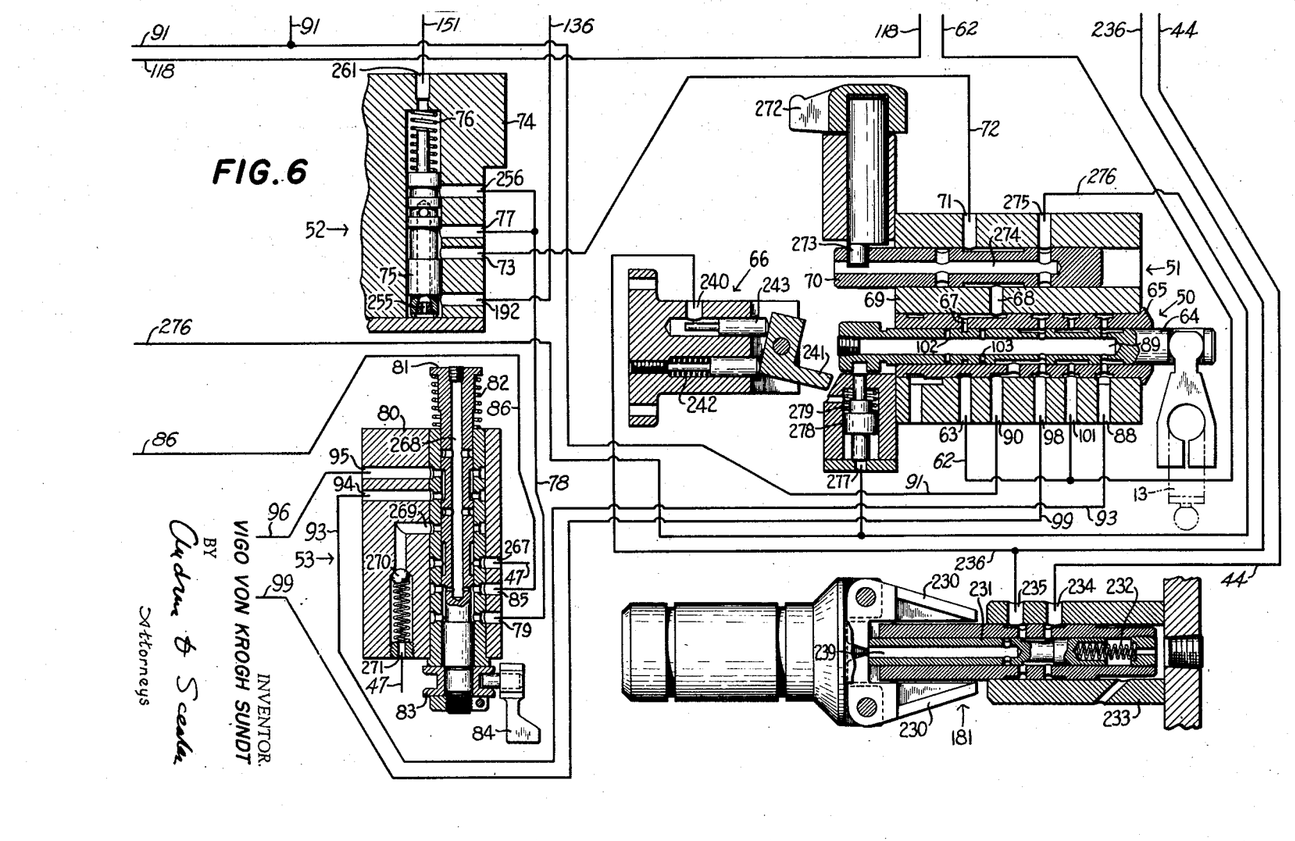
Fig. 6 is a diagrammatic view of the right lower portion of the hydraulic system.

In its neutral position, shown in Fig. 6, valve 50 admits the fluid at port 63 which passes around a circumferential groove in valve stem 64 and out through ports 67 in housing 65. Port 67 connects with a port 68 in the housing 69 of free spindle valve 51. A spool-type valve stem 70 is adapted to reciprocate in housing 69 and normally is disposed to the left as shown in Fig. 6. Fluid passing in through port 68 passes around a circumferential groove in valve stem 70 and hence through a port 71 in housing 69 to a line 72 which leads to a port 73 in brake pilot valve 52.

Valve 52 is connected between valve 50 and brake 12 and comprises a suitable housing 74 having a spool-type piston 75 adapted to reciprocate therein and normally biased downwardly by a spring 76, as shown in Fig. 6. Fluid passing in through port 73 passes through a chamber formed by piston 75 and then outwardly through a port 77 and through a line 78 to a port 79 in inching valve 53.

Valve 53 is manually operable and is connected between valve 50 and brake 12 and clutch 5. Valve 53 comprises a suitable housing 80 having a spool-type valve stem 81 disposed for reciprocating movement therein.

The upper end portion of valve stem 81 extends above housing 80 and has a spring 82 disposed circumferentially therearound which biases valve stem 81 upwardly. A suitable spool 83 is secured to valve stem 81 at the lower end thereof outside housing 80, spool 83 being connected to an inching lever 84 mounted on headstock 3.

Inching valve 53 remains in its normal position shown in Fig. 6, i.e., open between valve 50 and brake 12, except during a spindle inching operation which will be described hereinafter.

Fluid from line 78 enters port 79 of valve 53 and passes through a chamber formed by valve stem 81 and then outwardly through a port 85 and through a line 86 to a port 87 leading to piston 40 in brake cylinder 41, opposing the action of spring 42 to apply the brake.

At the same time a port 88 in clutch control valve 50 will be connected through a longitudinal passage 89 in valve stem 64 and through a port 90 and a line 91 to cascade 92. Port 88 leads from valve 50 through a line 93 to a port 94 in inching valve 53 and hence through a chamber formed by valve stem 81 to a port 95 and then through a line 96 to a port 97 in forward clutch 5.

In addition, a port 98 in clutch control valve 50 is similarly connected to cascade 92 through port 90 and line 91. Port 98 leads from valve 50 through a line 99 to a port 100 in reversce clutch 6.

Cascade 92 is disposed within headstock 3 and above the various clutches and gears and provides a spray of fluid to lubricate the same.

It will be seen that when valve 50 is in neutral position, clutches 5 and 6 will normally be disengaged and brake 12 will normally be applied to prevent rotation of spindle 2. A port 101 in valve 50 and connected to line 62 is blocked off by valve stem 64.

When it is desired to start rotation of spindle 2 in a forward direction, lever 13 is shifted from the neutral or central position to the right or forward position. This shifts valve stem 64 to the right so that fluid entering port 63 from line 62 is connected through a drain hole 102 in valve stem 64 to passage 89 and hence through port 90 and line 91 to cascade 92.

The fluid between ports 68 and 71 and brake piston 40, described above, will also be connected through hole 102 to cascade 92, thereby allowing spring 42 to push piston 40 upwardly and release the spindle brake.

Fluid passing in port 101 from line 62 will now be connected through a chamber formed by valve stem 64 to port 88 and hence through line 93 and through ports 94 and 95 of inching valve 53 to line 96 and port 97 to engage forward clutch 5. Port 98 in clutch control valve 50 remains open to drain, assuring that reverse clutch 6 will continue to be disengaged.

When it is desired to start rotation of spindle 2 in a reverse direction, lever 13 is shifted to the left or reverse position. This shifts valve stem 64 to the left. Fluid entering port 63 is again connected to passage 89 through a drain hole 103 in valve stem 64 and passes on through port 90 and line 91 to cascade 92. Brake port 87 will again be connected to the cascade through inching valve 53, ports 68 and 71 and hole 103, so that brake 12 will be released.

Fluid passing in port 101 from line 62 will now be connected through a chamber formed by valve stem 64 to port 98 and hence through line 99 to port 100 in reverse clutch 6 to engage the clutch for reverse rotation of spindle 2.

Port 88 in valve 50 will again be connected to cascade 92 through passage 89, port 90 and line 91, so that forward clutch 5 will be disengaged.

It will thus be seen that when valve 50 is in a position other than neutral, i.e., the forward or reverse spindle drive position, the respective forward or reverse clutch 5 or 6 will normally be engaged and brake 12 will normally be automatically disengaged.

The hydraulic control mechanism for operating high and low clutches 7 and 8 includes, in general: a high-low clutch pilot valve 104, a distributor timer valve 105, a speed selector cam 106, and a high-low pilot valve 107.

High-low clutch pilot valve 104 is connected between pump 43 and clutches 7 and 8 and comprises a suitable housing 108 and a spool-type piston 109 adapted to reciprocate within the housing. When piston 109 is positioned to the left, a port 110 in housing 108 will connect through a chamber formed by piston 109 to a port 111 which leads through line 91 to cascade 92. Port 110 leads through a line 112 leading to port 113 in low clutch 8.

At the same time, fluid may enter a port 114 in housing 108 and pass through a chamber formed by piston 109 to a port 115 which connects through a line 116 to a port 117 in high speed clutch 7. Fluid enters port 114 from a line 118 which leads from a port 119 in high-low pilot valve 107.

Valve 107 is connected between pump 43 and valve 104 and comprises a piston 120 disposed to reciprocate within housing 54 and normally biased downwardly by a spring 121. In its normal position, valve 107 admits constant pressure fluid through a port 122, the fluid passing around a groove formed by piston 120 and to port 119 and hence to port 114 in high-low clutch pilot valve 104. During a cycle, described hereinafter, valve 107 prevents the flow of fluid to the selectively engaged clutch 7 or 8 when brake 12 is engaged.

When piston 109 is to the left, low clutch 8 will thus be disengaged and high clutch 7 may be engaged.

Figure 5:
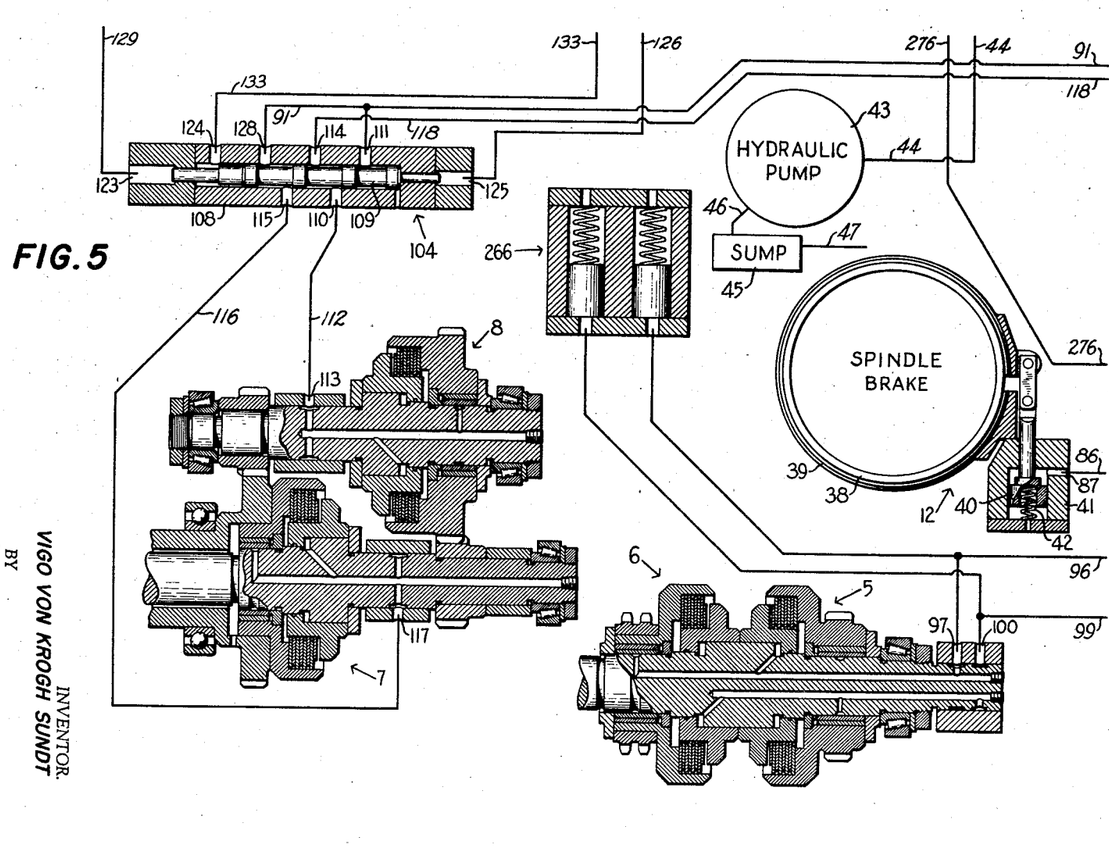
Fig. 5 is a diagrammatic view of the left lower portion of the hydraulic system.

When high speed clutch 7 is to be disengaged by the action of valve 104, fluid may enter either a port 123 or a port 124 to push piston 109 to the right as shown in Fig. 5. Fluid behind or to the right of piston 109 will pass through a port 125 and hence through a line 126 to a port 127 in cam 106, the latter connecting to drain in a manner to be described. Under these conditions, fluid in high clutch 7 is connected from port 117 through line 116 to port 115 in valve 104, and hence through a groove formed by piston 109 to a port 128 and through line 91 to cascade 92. At the same time fluid may enter port 114 and pass through a groove formed by piston 109 to port 110, line 112, and port 113 in low speed clutch 8 to engage the clutch.

Fluid enters port 123 in valve 104 through a line 129 which connects with a port 130 in the housing 131 of distributor timer valve 105. Port 130 is connected to a source of fluid pressure through a groove formed by the piston 132 of valve 105, under certain conditions described hereinafter. Fluid may enter port 124 in valve 104 through a line 133 which connects with a port 134 in speed selector cam 106, which is described more fully hereinafter.

To provide engagement of high speed clutch 7 from the disengaged position, fluid enters port 125 from cam 106 in a manner to be described, pushing piston 109 to the left. Port 124 will be connected through cam 106 to drain.

It can thus be seen that when piston 109 is positioned to the left, low clutch 8 will be connected to cascade 92 and disengaged, and high clutch 7 will be engaged if fluid is passing in through port 114. When piston 109 is positioned to the right, high clutch 7 will be connected to cascade 92 and disengaged, and low clutch 8 will be engaged if fluid is passing in through port 114.

In some instances, as where it is desirable that neither high nor low clutches 7 and 8 be engaged, fluid is prevented from entering port 114. This is accomplished under conditions described hereinafter by fluid passing from a port 135 in distributor timer valve 105 and through a line 136 to a port 137 in high-low pilot valve 107. Fluid passing in port 137 pushes piston 120 upwardly against the force of spring 121 and cuts off the constant pressure fluid normally flowing from port 122 to port 119 and hence to port 114 in valve 104.

Gear shifter transmissions 9, 10 and 11 are adapted to be moved along their respective shafts by shifter shoes 32, 35 and 37, respectively, which engage the transmissions. Shifting of transmission 9 provides engagement with one or the other of the pair of gears on extension 30 of sleeve 23, shifting of transmission 10 provides engagement with one or the other of the pair of gears on member 34 on shaft 31, and shifting of transmission 11 provides engagement with one or the other of the pair of gears on member 36 on spindle 2 for rotatably driving the latter.

Shoes 32, 35 and 37 are moved to effect shifting of their respective transmissions by gear shifter units 138, 139 and 140 respectively. Shoe 32 is secured to the outer extremity of a piston 141 which is adapted to reciprocate in a housing 142, shoe 35 is secured to the outer extremity of a piston 143 which is adapted to reciprocate in a housing 144, and shoe 37 is connected to the outer extremity of a piston 145 which is adapted to reciprocate in a housing 146. Shoe 37 extends downwardly from piston 145, as shown in Fig. 3, and is slidably connected to an axially outwardly extending rod portion of the primary piston 147 of a free spindle pilot valve 148 which operates in conjunction with free spindle valve 51 and will be described more fully hereinafter.

The gear shifter units are actuated hydraulically by the operation of valve 105 to provide eight different spindle speeds selectively controlled by speed selector cam 106. Cam 106 is disposed in a hydraulic line between valve 105 and units 138, 139 and 140 and comprises a suitable housing 149 having a cylindrical cam body 150 disposed for rotation therein. Housing 149 has a plurality of ports therein which pass inwardly from the outer surface thereof and register with a selected number of grooves and/or drain openings in cam body 150.

Figure 3:
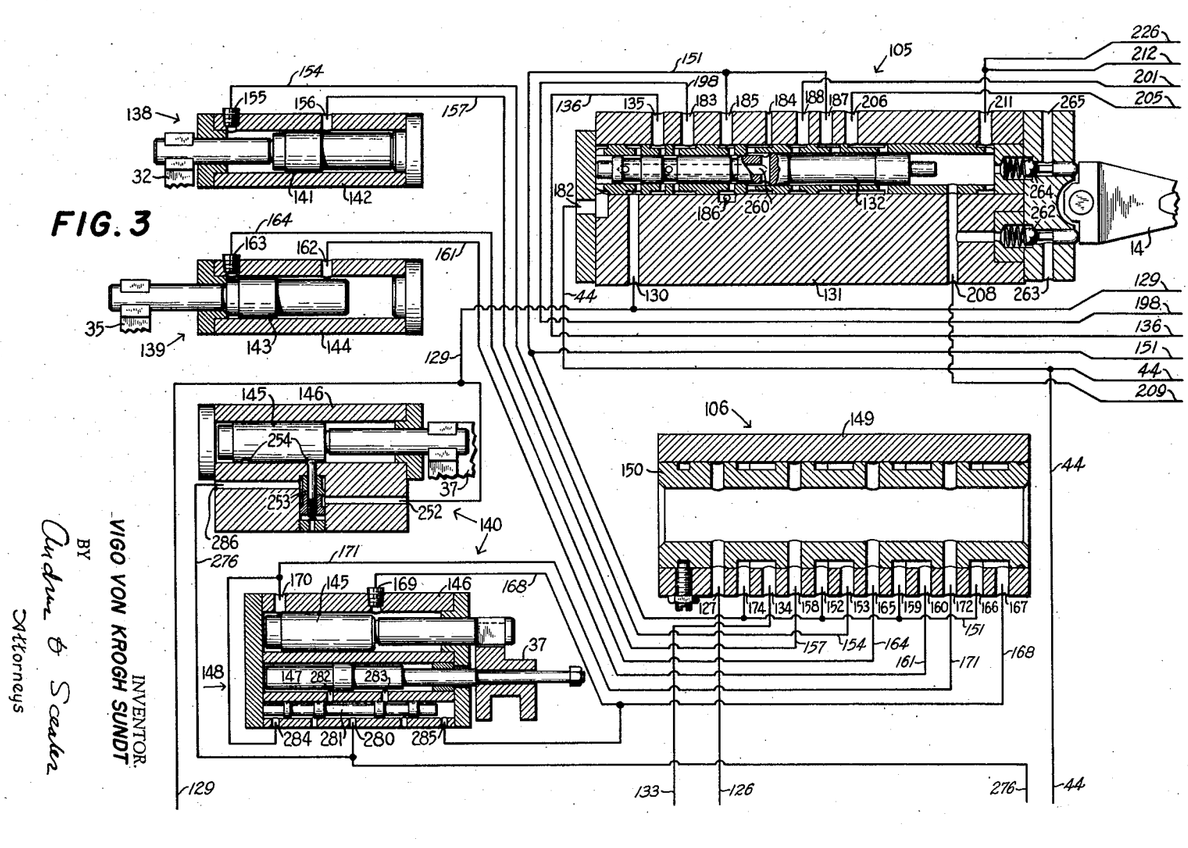
Fig. 3 is a diagrammatic view of the left upper portion of the hydraulic system and showing one of the gear shifter units in two different sections.
Figure 7:
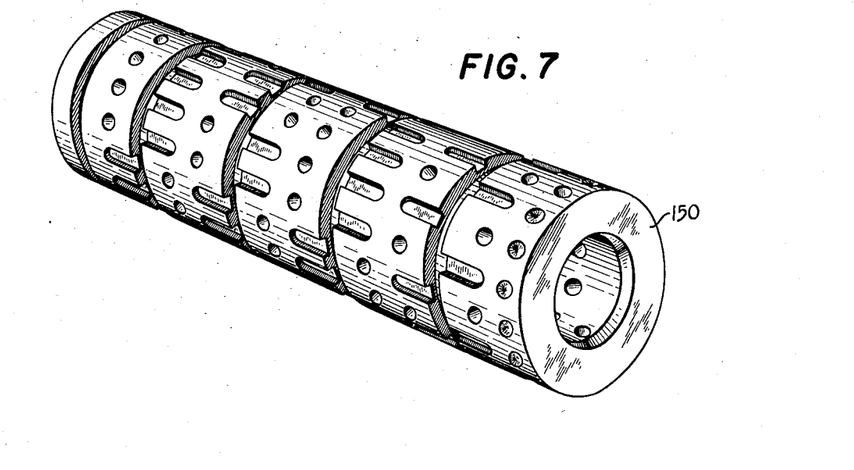
Fig. 7 is a perspective view of the speed selector cam body.

Fig. 7 shows cam body 150 in perspective, while the section of the cam body shown in the schematic diagram of Fig. 3 indicates only one of sixteen possible positions of the cam, i.e., that position where it is desirable to shift all of the transmission gears from one position to another during a shifting operation.

Assume that cam body 150 has been turned to the position shown in Fig. 3 by manually turning handwheel 15 to which the cam body is connected. Fluid is supplied to cam 106 through a line 151 from distributor timer valve 105 in a manner to be described hereinafter. Fluid enters a port 152 and passes through a groove in cam body 150 to a port 153 and hence through a line 154 to a port 155 in gear shifter unit 138 to push piston 141 to the right, as shown in Fig. 3. Gear shifter transmission 9 will be thereby moved to the right. A port 156 disposed adjacent the right half of piston 141 will be connected through a line 157 to a port 158 in cam 106 which in turn connects through a drain hole in cam body 150 to drain.

Fluid also enters a port 159 from line 151 and passes through a groove in cam body 150 to port 160 and hence through a line 161 to a port 162 in gear shifter unit 139 to push piston 143 to the left, as shown in Fig. 3, thereby shifting gear shifter transmission 10 to the left. A port 163 disposed adjacent the left end portion of piston 143 will be connected through a line 164 to a port 165 in cam 106, which in turn connects through a drain hole in cam body 150 to drain.

In like manner, fluid enters a port 166 from line 151, and passes through a groove in cam body 150 to a port 167 and hence through a line 168 to a port 169 in gear shifter unit 140 to push piston 145 to the left, as shown in Fig. 3, thereby shifting gear shifter transmission 11 to the left. A port 170 adjacent the left end of piston 145 will be connected through a line 171 to a port 172 in cam 106 which in turn connects through a drain hole in cam body 150 to drain.

With the above described setting of speed selector cam 106 each of the three transmissions will be shifted simultaneously in a specific direction to effect a given selected speed of spindle 2. A different setting of cam 106 would result in one of the other following possible positions of gears 9, 10 and 11:

(a) Transmission 9 to the left with transmissions 10 and 11 to the right, the opposite of the final positions described above, or (b) Transmissions 9 and 10 to the left with transmission 11 to the right, or (c) Transmissions 9 and 11 to the left with transmission 10 to the right, or (d) Transmissions 9 and 10 to the right with transmission 11 to the left, or (e) Transmissions 9 and 11 to the right with transmission 10 to the left, or (f) Transmissions 9, 10 and 11 to the left, or (g) Transmissions 9, 10 and 11 to the right.

To obtain each of the above desired eight positions, corresponding to eight different spindle speeds, cam body 150 will be set so that the various grooves and drain holes therein will register differently with the various ports in housing 149 to move pistons 141, 143 and 145 accordingly.

Visual indication of the desired speed is provided by suitable markings on handwheel member 15, together with markings on a fixed speed indicator plate 173 mounted beneath handwheel 15 on headstock 3 and observable through openings in the handwheel.

The eight speeds produced by cam 106 are complemented by high and low speed clutches 7 and 8 to produce a total of sixteen selectively different predetermined spindle speeds in each direction. These clutches will be selectively engaged depending on the position of cam body 150.

Fig. 3 shows one of the low speed group positions of cam body 150 necessary to produce engagement of low speed clutch 8. Fluid passing through line 151 from distributor timer valve 105 passes into a port 174 in housing 149, through a groove in cam body 150 to port 134 and hence through line 133 to port 124 in valve 104 to push piston 109 to the right. At the same time, port 125 would be connected through line 126 and port 127 to a drain hole in cam body 150 and hence to drain.

If high speed clutch 7 is to be engaged, cam body 150 will be positioned to allow fluid from line 151 to connect through port 174 to port 127 and hence to port 125 in valve 104 to push piston 109 to the left. At the same time, port 124 would be connected through port 134 to drain. This position of cam 106 is not shown in the drawings.

Turning of handwheel 15 from one position to another will effect an automatic gear change within headstock 3 to produce a new spindle speed. The hydraulic control system for producing this automatic gear change includes distributor timer valve 105, as well as direct-preset valve 175, timer poppet valve 176, pressure regulating valve 177, shut-off valve 178, distributor pilot valve 179, high-low shock valve 180, and governor 181.

The distributor timer valve 105 is the heart of the automatic gear change control, and is actuated by fluid pressure to produce an hydraulic cycle for shifting the transmission gears to change the spindle speed. Valve 105 is connected to constant pressure through a port 182 disposed at the left of piston 132. The normal position of valve 105 is shown in Fig. 3. In this position, ports 130, 135 and 183 are connected to drain through a longitudinal opening in piston 132 and a port 184 in housing 131. A port 185 is connected to drain through a separate port 186. A port 187 is connected to port 185 through an extension of line 151 and thus is also connected to drain through port 186. A port 188 is connected to port 187 through a groove in piston 132, and is therefore also connected to drain through port 186.

Since port 130 is connected to drain, port 123 in high-low clutch pilot valve 104 is connected to drain through line 129, and a port 189 in pressure regulator pilot valve 49 is also connected to drain through line 129 so that the valve piston 58 is in its normal position, i.e., biased upwardly by the spring 59 in housing 54. Valve 49 is disposed in an hydraulic line between pump 43 and clutches 5 and 6 and is normally open therebetween.

Since port 135 in valve 105 is connected to drain, a port 192 in the lower end portion of brake pilot valve 52 is connected to drain through line 136 so that the valve piston 75 will be in its normal downwardly biased position. A port 193 in the lower portion of forward and reverse pilot valve 48 is also connected through line 136 to valve 105 and to drain so that the valve piston 55 will be in its normally downwardly biased position. In addition, port 137 in high-low pilot valve 107 is connected to drain through line 136 so that valve piston 120 is in its normally downwardly biased position. Port 135 also leads through line 136 to a port 194 in the housing 195 of high-low shock valve 180. Since port 135 is connected to drain, the piston 196 in valve 180 will be in its upward position, shown in Fig. 4, at low spindle speeds.

Since port 183 is connected to drain, a port 197 in the lower portion of shut-off valve 178 will be connected to drain through a line 198. In addition, a port 199 in distributor pilot valve 179 and disposed adjacent the upper end of the valve piston 200 in housing 54, will be connected to drain through line 198, so that piston 200 will be at its upward position, shown in Fig. 4, at relatively low spindle speeds as determined by governor 181, to be described.

Port 185 in valve 105 connects with line 151 to the various intake ports 174, 152, 159 and 166 of speed selector cam 106, and since port 185 is connected to drain, gear shifter units 138, 139 and 140 and high-low clutch pilot valve 104 will be prevented from drifting movement.

Port 188 connects through a line 201 to a port 202 in the upper portion of shut-off valve 178, thereby draining the chamber above the valve piston 203. In the normal position of valve 178, shown in Fig. 4, constant pressure fluid entering at a port 204 will be blocked by piston 203.

Fluid in a line 205 between a port 206 in valve 105 and a port 207 in shut-off valve 178 is blocked by pistons 132 and 203, respectively.

A port 208 is disposed slightly inwardly from the right end portion of valve housing 131, and connects through a line 209 to a port 210 in valve 180. Fluid in line 209 will be blocked off by piston 196 in valve 180 at relatively low spindle speeds as determined by governor 181, to be described.

A port 211 is disposed adjacent the right end portion of the piston chamber of housing 131 and connects through a line 212 to a port 213 adjacent the upper portion of direct-preset valve 175. Valve 175 includes a cam 214 adapted to selectively seat or unseat a spring-pressed ball 215 to either allow fluid to pass from port 213 to a port 216 in housing 54 or to block fluid off. Cam 214 is connected to a preset lever 217 mounted on headstock 3. When lever 217 is in the "preset" position, cam 214 will be turned so ball 215 is seated, preventing fluid from passing from port 213 to port 216. When lever 217 is in the "direct" position, cam 214 will be turned so ball 215 is unseated, allowing fluid to pass from port 213 to port 216.

For the present, it will be assumed that lever 217 is in the "direct" position. Port 216 connects through a line 218 to a port 219 in timer poppet valve 176. Valve 176 operates to initiate the hydraulic cycle and is connected to valve 105. Valve 176 comprises a suitable housing 220 having a valve stem 221 adapted to reciprocate therein and normally biased downwardly by a spring 222 disposed in the housing. A nubbin 223 is disposed on the lower end portion of valve stem 221 and extends outwardly from housing 220 to engage the notches on a rotatable cam 224. Cam 224 is connected to handwheel 15 and is adapted to be rotated thereby in a manner similar to cam body 150 of speed selector cam 106. Each notch on cam 224 corresponds to a different position of speed selector cam 106 for gear change purposes.

When valve stem 221 is in its normal downward position, port 219 is blocked, thereby preventing passage of fluid from port 211 in distributor timer valve 105 through direct-preset valve 175 to timer poppet valve 176. At the same time, nubbin 223 is biased downwardly to a position between the notches of cam 224, as shown in Fig. 4.

Port 211, disposed adjacent the right end portion of the piston chamber of housing 131, also connects through a line 226 to a port 227 in valve 179 which has a timer plug 228 disposed therein to restrict passage of fluid from port 227 to port 211.

When piston 200 of distributor pilot valve 179 is in its upward position, fluid under constant pressure will enter the valve at a port 229 and connect through a groove formed by the piston to port 227 and hence to port 211, passing through plug 228, to hold piston 132 at its leftmost or normal position.

Governor 181 is mounted adjacent the right end portion of shaft 31 within headstock 3, and rotates simultaneously with spindle 2. The governor comprises a pair of wings 230 secured to the end of the shaft and which are in closed position when spindle 2 is not turning and which gradually open as the speed of the spindle increases. The inner portion of wings 230 are engaged by the outer end of a spool type valve stem 231 which is biased against the wings by a spring 232 mounted in a suitable sleeve disposed within the valve housing 233. Opening of the wings moves valve stem 231 rearwardly against spring 232.

Figure 8:
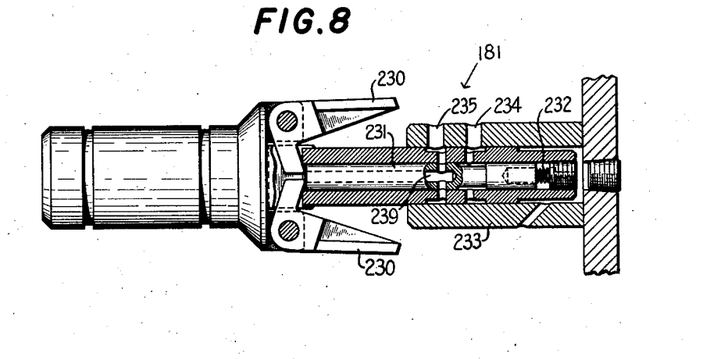
Fig. 8 is a detail sectional view of the governor shown with the wings open during a high speed of spindle rotation.

Housing 233 has a port 234 therein which connects to constant pressure line 44. A second port 235 connects through a line 236 to a port 237 in the lower end portion of high-low shock valve 180 and also to a port 238 in the lower end portion of distributor pilot valve 179. When spindle 2 is rotating at one of the eight low speeds, wings 230 will be only partially open and valve stem 231 will be disposed to connect port 235 with port 234 so that fluid will enter ports 237 and 238 to push pistons 196 and 200 to an upward position. When spindle 2 is rotating at one of the eight high speeds, shown in Fig. 8, wings 230 will be relatively further open and valve stem 231 will be disposed to block constant pressure fluid coming in port 234 and to open port 235 to drain through a passage 239 in valve stem 231. This will drain ports 237 and 238 in valves 180 and 179, and pistons 196 and 200 will either remain stationary or move downwardly, depending on whether fluid is entering ports 194 and 199.

Line 236 also connects port 235 with a port 240 in high speed reversing safety lock 66 which is controlled by the governor and disposed adjacent valve 50. Lock 66 is designed to prevent the operator from moving forward-reverse lever 13 from the forward to the reverse position when spindle 2 is moving at high speeds. The safety lock 66 is actuated by fluid pressure and includes a latch member 241 secured to a housing and which is engaged by a biasing spring 242 and a piston 243 disposed within the housing. At high speeds, port 235 and thus port 240 are connected to drain, allowing spring 242 to bias latch 241 to a position behind clutch control valve stem 64, thereby preventing movement of valve stem 64 to the left or reverse position. At low speeds, ports 235 and 240 receive fluid under constant pressure from port 234 so that piston 243 pushes latch 241 out of the way of valve stem 64 to allow leftward movement of the latter.

Before describing the gear change cycle, the function of pressure regulating valve 177 will be described. Valve 177 comprises a passage 244 disposed vertically in housing 54 and having a ball check 245 disposed adjacent the upper end thereof and a similar ball check 246 adjacent the lower end thereof.

When pressure regulator pilot valve 49 is in its normal position, constant pressure fluid will pass in port 60 and through port 57 to valve 48 and hence to valve 50 and either the forward or reverse clutch, as described above. At the same time, port 57 connects with a port 247 which leads from valve 49 to above ball check 245. Fluid in port 247 is blocked by ball check 245.

During a gear change, to be described hereinafter, fluid passes from port 130 in distributor timer valve 105 and through line 129 to port 189 in pressure regulator pilot valve 49, pushing piston 58 downwardly and blocking off the constant pressure fluid entering at port 60. At the same time, fluid passing in port 189 will pass through a restriction member 248 in the upper end of piston 58 and will pass through a longitudinal passage therein to a port 249, which connects centrally with the passage 244. This fluid will pass upwardly through ball check 245 and hence through ports 247 and 57 and on to clutch control valve 50. At the same time, fluid may also pass downwardly through ball check 246 to a port 250 which leads to drain, thus bleeding off some of the constant pressure fluid to reduce the pressure going to the forward and reverse clutches. The amount of reduced pressure incident on the clutches 5 and 6 may be regulated by adjusting the tension of the spring of ball check 246.

Valve 177 provides a by-pass for valve 49 when the latter is actuated by operation of valve 105.

For purposes of describing the change in spindle speed, it will be assumed that the spindle is already operating in a forward direction at one of the speeds requiring the use of high clutch 7. Valves 48, 49, 51, 52, 53, 105, 107 and 176 will be in their normal or neutral positions. Clutch control valve 50 is in the forward position, i.e. to the right. High-low clutch pilot valve 104 is in the left or high position. Speed selector cam 106 is in any one of the eight possible high positions and gear shifter units 138, 139 and 140 are positioned accordingly. Direct-preset valve 175 is in the "direct" position. Shut-off valve 178 is in its downward position; and distributor pilot valve 179 and high-low shock valve 180 are in their upward positions. Wings 230 of governor 181 will be open to their wider position.

To change the spindle speed to another one of the eight high speeds, handwheel 15 is turned to the desired new speed, changing the position of cam 106. This will also turn cam 224 and the notches therein will raise nubbin 223 upwardly, pushing valve stem 221 to its uppermost position to connect port 219 to a port 251 and hence to drain. This drains port 211 behind or to the right of piston 132 of distributor timer valve 105, allowing fluid entering at port 182 to push piston 132 to the right.

As piston 132 moves to the right, it first uncovers port 130, allowing fluid to pass therethrough and:

(a) Through line 129 to a port 252 in gear shifter unit 140, which disengages a gear lock piston 253 from one of a pair of slots 254 in piston 145 to unlock gear shifter unit 140 for subsequent movement;

(b) Through line 129 to port 123 in high-low clutch pilot valve 104, pushing piston 109 to the right to disengage high clutch 7 and engage low clutch 8. Valve 104 is operable by valve 105 during a cycle and by cam 106 to supply fluid selectively to clutches 7 and 8;

(c) Through line 129 to port 189 in pressure regulator pilot valve 49, blocking off constant pressure fluid entering at port 60 but allowing a reduced pressure to pass from port 61 in forward reverse pilot valve 48 to forward clutch 5 to produce a slight drag on the latter to allow the transmission gears to rotate slowly and slide into the respective gears on the various shafts within the headstock to prevent clashing of the transmission gears subsequently during the gear change.

As piston 132 moves further to the right, it uncovers port 135, allowing fluid to pass therethrough and:

(a) Through line 136 to port 194 in high-low shock valve 180, moving piston 196 downwardly and opening port 210 and therefore port 208 in valve 105 to drain. This has no effect on the gear change cycle;

(b) Through line 136 to port 192 in brake pilot valve 52, pushing piston 75 upwardly against the force of spring 76. The fluid will pass behind the piston and through a restriction member 255 and hence through a passageway in the piston to a port 256. Port 256 connects with line 78 so that the pressure fluid will pass through inching valve 53 to brake 12 and apply the brake to slow down the spindle. Ports 73 and 77 in valve 52 are blocked off by piston 75;

(c) Through line 136 to port 137 in high-low pilot valve 107, pushing piston 120 upwardly against spring 121. This will block constant pressure entering at port 122 and will open port 119 to drain through a passageway 257 in piston 120. Low speed clutch 8 is thus disengaged when the spindle brake is applied to prevent dragging of the clutch. The change from high speed clutch 7 to low clutch 8, described previously, occurs only a moment prior to the engagement of brake 12 and disengagement of clutch 8, since piston 132 normally makes a complete cycle in a matter of seconds;

(d) Through line 136 to port 193 in forward and reverse pilot valve 48, pushing the piston 55 upwardly against spring 56. This blocks fluid passing from pump 43 through port 57 and opens port 61 to drain through a passageway 258 in piston 55. Forward clutch 5 will be disengaged thereby.

As piston 132 moves farther to the right, it reaches the end of its stroke and uncovers port 183, allowing fluid to pass therethrough and:

(a) Through line 198 to port 199 in distributor pilot valve 179, pushing piston 200 downwardly and opening port 227 and thus port 211 in valve 105 to drain, through a port 259. Constant pressure entering at port 229 is blocked;

(b) Through line 198 to port 197 in shut-off valve 178, pushing piston 203 upwardly to allow constant pressure fluid entering port 204 to pass through port 207 and hence through line 205 to port 206 in distributor timer valve 105.

As the brake 12 is applied and spindle 2 slows down, wings 230 of governor 181 will gradually move toward their closed position, and at a certain low speed, valve stem 231 will connect port 235 with port 234, allowing fluid under constant pressure to pass to port 237 of high-low shock valve 180. Since the lower end portion of piston 196 has a larger area than the upper end portion, piston 196 will be forced upwardly to again block off port 210 and also port 208 in valve 105.

At the same time, fluid will pass from port 235 to port 238 in distributor pilot valve 179. Since the lower end portion of piston 200 has a larger area than the upper end portion, piston 200 will be forced upwardly to again allow constant pressure fluid to pass from port 229 and through timer plug 228 to port 227 and hence to port 211 in distributor timer valve 105.

Distributor pilot valve 179 functions during a gear change cycle to delay any return movement of piston 132 toward its initial position until the spindle is rotating at a low speed. When the spindle reaches low speed valve 179 will be actuated by the governor to permit piston 132 to move to the left, which will disengage the brake and engage the low speed clutch. There will be no shock on clutch 8, since spindle 2 has been permitted to slow down to a predetermined low speed before engagement of the clutch.

The right end portion of piston 132 has a greater diameter than the left end portion so that as fluid enters the valve chamber from port 211, the piston will be forced back against the pressure of fluid entering at port 182. The speed of return of piston 132 will be determined by the size of the restriction in timer plug 228.

By this time, nubbin 223 of timer poppet valve 176 is again disposed between two notches on cam 224, and therefore port 211 in valve 105 is no longer connected to drain but is blocked off by valve stem 221.

As piston 132 moves to the left, it first connects port 183 with a passageway 260 in the piston which in turn connects through a groove to port 184 and hence to drain. Opening port 183 to drain serves to drain port 199 in distributor pilot valve 179 and to drain port 197 in shut-off valve 178.

At the same time, piston 132 connects port 206 with port 187 through a suitable groove or recess. Fluid entering port 206 from shut-off valve 178 will pass through port 187 and:

(a) Through line 151 to a port 261 disposed in the upper end portion of brake pilot valve 52. Since the areas adjacent both ends of piston 75 are equal, and since equal pressure is incident on both ends thereof, the pressure due to spring 76 will force the piston downwardly to its normal position. This will prevent fluid pressure at port 192 from connecting with port 256 and brake 12. The brake will again be connected through ports 77 and 73 to clutch control valve 50 and drain, thus releasing the brake and leaving spindle 2 free to turn when transmission 11 meshes with one of the gears on member 36 so that the dragging motion of clutch 5 may continue;

(b) Through line 151 to suitable ports in cam 106 to produce a shift of some or all of gear shifter units 138, 139 and 140 to change the position of the corresponding gear shifter transmissions in the headstock. Fluid will also enter port 174 in cam 106 and pass outwardly through port 134 to port 124 in high-low clutch pilot valve 104. When cam body 150 is in a high speed group, fluid will always enter port 125 at this portion of the cycle. However, since the left end portion of piston 109 is larger in area than the right end portion, and since fluid is incident on the left end of piston 109, the piston will remain to the right.

As piston 132 moves further to the left, it connects port 135 to drain through passageway 260 and port 184. This will:

(a) Drain port 192 in brake pilot valve 52 producing no change in the valve since piston 75 is already in its downward position;

(b) Drain port 194 in high-low shock valve 180 producing no change in the valve since piston 196 is already in its upward position;

(c) Drain port 193 in forward and reverse pilot valve 48 to allow piston 55 to return to its normal downward position so that reduced pressure may pass from port 57 through port 61 and hence to forward clutch 5 to give a slight drag on the clutch and turn the gears in the headstock slowly to permit them to mesh without clashing;

(d) Drain port 137 in high-low pilot valve 107 to allow piston 120 to return to its normal downward position to allow constant pressure entering port 122 to pass through port 119 to port 114 in high-low clutch pilot valve 104 to engage the low clutch 8.

As piston 132 moves further to the left, it connects port 130 to drain through passageway 260 and port 184. This will:

(a) Drain port 252 leading to gear lock piston 253 to release the piston so that it engages one of the slots 254 in piston 145 and prevents the latter from drifting;

(b) Drain port 123 in high-low clutch pilot valve 104 to allow fluid entering at port 125 to push piston 109 to the left to provide disengagement of low clutch 8 and engagement of high clutch 7;

(c) Drain port 189 in pressure regulator pilot valve 49 to allow piston 58 to return to its normal upward position so that constant pressure will again pass directly from port 60 to port 57 and out through port 61 of valve 48 to forward clutch 5. Fluid passing in port 247 will again be blocked by valve 49, cutting out the reduced drag pressure on forward clutch 5.

Just before piston 132 reaches the end of its return stroke, port 188 is indexed with port 206 so that fluid passes from port 206 through port 188 to port 202 of shut-off valve 178. This will return piston 203 to its normal downward position and cut off the flow of fluid from port 207 to port 206.

When piston 132 reaches the end of its return stroke, valve 105 will again be in its normal condition, as described above, and spindle 2 will be rotating at the designated new high speed.

A gear change from high to low speed, from low to another low, or from low to high will normally produce a functioning of the control mechanism in a manner substantially similar to that described above, with a forward and return stroke of piston 132 in valve 105. When the apparatus is functioning only in the low speed groups, as with a change from one low speed to another, valves 180 and 179 will remain in their normal upward positions throughout.

The shut-off valve 178 functions as a safety device in the event that piston 132 does not move all the way to the right when a gear change cycle in the high speed group is initiated. If handwheel 15 is turned too fast, or if dirt or other foreign matter should penetrate into the piston chamber of valve 105, piston 132 might be prevented from moving all the way to the right and might not open port 183 to constant pressure. Distributor pilot valve 179 therefore will not function to prevent the return of piston 132 to the left until a slow spindle speed is attained, and fluid will continue to pass in through port 211 to push piston 132 back.

Without shut-off valve 178 in the circuit, fluid would continuously pass in through port 206, and the gear units 138, 139 and 140 would be selectively actuated while the spindle is still at high speed, producing a clashing of the transmission gears. Brake 12 would be applied and then released quickly thereafter, without having slowed the spindle down substantially.

With the shut-off valve 178 in the circuit, no fluid can pass to port 206 and hence to the gear shifter units unless piston 132 moves all the way to the right, since piston 203 blocks fluid from port 206 until port 183 is opened to pressure and pushes piston 203 upwardly. Since distributor pilot valve 179 functions simultaneously with shut-off valve 178, no gear change can take place unless the spindle has been allowed to slow down. If piston 132 makes only a partial cycle and does not open port 183 to pressure, the gears will not be changed and the operator will have to initiate a new cycle to obtain the gear change.

In some instances, as where it is desired to shift from a high to a low speed with a ratio of eight to one, it is not necessary to turn handwheel 15 because no gear change is necessary. In this instance, the low speed may be quickly obtained by a light downward pressure on high-low trip lever 14. This will unseat a ball check 262 disposed in connection with port 208 of distributor timer valve 105. Fluid will drain from behind or to the right of piston 132, through a portion of port 208 and ball check 262 and out through a port 263 to drain, allowing fluid entering port 182 of valve 105 to push piston 132 to the right. Piston 132 will only go through a partial cycle and will only move until it has covered port 208, at which time the additional fluid to the right of the piston will prevent further movement thereof. Shifting of piston 132 partially to the right will uncover ports 130 and 135 only, producing the changes described above in regard to uncovering of these two ports. Piston 109 of high-low clutch pilot 104 will be pushed to the right, producing a disengagement of high speed clutch 7 and engagement of low speed clutch 8. Almost simultaneously the brake 12 will be applied and low clutch 7 will be disengaged temporarily. Forward clutch 5 will also be disengaged temporarily. The spindle will still be traveling at high speed.

At the high speed, port 237 of high-low shock valve 180 will be open to drain, and port 194 will receive fluid from port 135 to push piston 196 down and open port 208 in valve 105 to drain. When wings 230 begin to close, piston 196 will be forced up again and block port 210 and thus close port 208. Since high-low trip lever 14 was only depressed momentarily, there is now no drain behind piston 132 and the piston will return to its normal position, producing changes similar to those described above. There will be no change of gears, since handwheel 15 was not turned.

The high-low shock valve 180 functions during a change from an eight-to-one high-to-low speed to delay any return movement of piston 132 towards its initial position until the spindle is at a low speed. When the spindle reaches low speed, valve 180 will be actuated by the governor to permit piston 132 to move to the left, which will disengage the brake and engage the low speed clutch. There will be no shock on the low speed clutch, since spindle 2 has been permitted to slow down to a predetermined low speed before engagement of the clutch.

When it is desired to go back to the original high speed from low, the high-low trip lever 14 is moved upwardly momentarily to the "high" position. This unseats a ball check 264 at the extreme right end portion of the piston chamber of valve 105, draining the adjacent portion of the chamber through a port 265 and allowing piston 132 to travel all the way to the right and back again to produce the full cycle substantially as described above. Again there will be no gear shift since handwheel 15 has not been turned. On the return stroke of piston 132, port 123 in high-low clutch pilot valve 104 will be opened to drain and fluid will pass from port 187 through cam 106 to port 125 to return piston 109 to the left or high position. Low speed clutch 8 will be disengaged and high speed clutch 7 will again be engaged.

It is desirable to include a shock absorber in the hydraulic circuit to reduce the sudden shock incident on the forward and reverse clutches when either is being engaged, as when starting the spindle. A shock absorber unit, indicated generally at 266 in Fig. 5 of the drawings, contains a pair of chambers with each chamber connected to one of the lines 96 or 99 leading to forward and reverse clutches 5 and 6 respectively. Shock absorber unit 266 may be of any suitable type.

In many instances, it is desirable to be able to jog or inch the spindle around a slight amount to bring the spindle into a desirable position for chucking, unchucking or the like. This may be accomplished by use of the inching valve 53 when clutch control valve 50 is in neutral position. When spindle 2 is stopped, brake 12 is engaged and forward and reverse clutches 5 and 6 are disengaged. Fluid will be connected from valves 50 and 52 through ports 79 and 85 to the brake.

When inching valve lever 84 is moved to the "inch" position, valve stem 81 will be moved downwardly to disconnect fluid between valve 50 and brake 12 and will connect port 85 and brake piston 40 through a groove in valve stem 81 and a port 267 to drain. This will release the brake. Fluid entering at port 79 will travel through a passageway 268 in valve stem 81 and hence through a port 269. Port 269 leads to a ball check 270 which allows the fluid to escape through a port 271 to drain. At the same time, some of the fluid from clutch control valve 50 passes from passageway 268 to port 95 and hence to port 97 in forward clutch 5 to engage the clutch and turn spindle 2.

Only a reduced drag pressure is necessary for clutch 5 to turn spindle 2 slightly, and this pressure can readily be regulated by adjusting ball check 270. By jogging lever 84, a jogging or inching movement of the spindle can be obtained.

When clutch control valve 50 is in neutral position and spindle 2 is stopped, it is often desirable to be able to turn the spindle by hand. This may be accomplished by use of free spindle valve 51, which is actuated through a shaft by a lever 272 mounted on the headstock casing.

The shaft connected to lever 272 has an eccentric portion 273 on its inner end, as shown in Fig. 6, and when lever 272 is turned to the "free spindle" position, valve stem 70 is moved from its normal position to the right. Port 68 of clutch control valve 50 is blocked off from port 71 thereby and port 71 is connected through a passageway 274 in valve stem 70 to drain, thereby releasing brake 12 from the spindle. At the same time, fluid may now pass from port 68 through a port 275 in housing 69 and:

(a) Through a line 276 to a port 277 leading to an interlock piston 278, causing piston 278 to engage a slot in valve stem 64 of clutch control valve 50 to prevent the operator from moving the valve to start the spindle. Interlock piston 278 is normally biased away from valve stem 64 by a spring 279;

(b) Through line 276 simultaneously to a port 280 in free spindle pilot valve 148. Port 280 leads to a chamber having a secondary piston 281 disposed for reciprocating movement therein. The opposite side of the piston chamber leads via ports 282 and 283 to the chamber within which primary piston 147 is disposed. Port 170 in shifter unit 140 connects through a branch of line 171 to a port 284 adjacent one end of valve 148, and port 169 in shifter unit 140 connects through a branch of line 168 to a port 285 adjacent the other end of valve 148. Ports 170 and 285 are so disposed that secondary piston 281 will follow the motion of piston 147 in unit 140 and will be to the left or right to correspond with the position of piston 145. When fluid enters port 280, it will pass around suitable grooves in piston 281 and hence through either port 282 or 283 to move piston 147 either to the right or the left, depending on whether piston 147 was originally positioned to the left or the right. Shifting of piston 147 will shift shifter piston 145 accordingly to bring the respective gear of transmission 11 out of mesh with one of the gears on member 36 to free spindle 2 and allow manual turning thereof. The length of stroke of primary piston 147 is short compared with the possible length of stroke of piston 145 so that movement of the former will only bring transmission 11 out of mesh with member 36. The rod portion of piston 147 provides a lost motion device permitting the difference in possible stroke between piston 147 and piston 145 to provide independent functioning of the pistons;

(c) Through line 276 to a port 286 in unit 140 which leads to gear lock piston 253 and disengages the piston from one of the slots 254 to allow movement of piston 145.

When it is desired to return spindle 2 to its engaged state, lever 272 is turned to its original position which withdraws interlock piston 278 from piston 64 and again applies the brake. To re-engage the gears, high-low trip lever 14 is moved upwardly momentarily which drains the chamber to the right of piston 132 so that the piston goes through its complete cycle, as described above. Clutch control valve 50 is then moved to one of the drive positions, resulting in the spindle speed indicated by the selected position of cam 106.

Preset lever 217 makes it possible to set the headstock control for a new spindle speed in advance of the time when the new speed is desired. This is accomplished by turning lever 217 to the "preset" position so that ball 215 is seated in valve 175 and prevents fluid from passing from port 213 to port 216 and hence to port 219 in timer poppet valve 176. If handwheel 15 is now turned, the fluid to the right of piston 132 cannot drain out through valve 176, since it is blocked by ball 215. There will be no cycle of distributor timer valve 105, even though a new speed has been selected.

When it is desired to utilize the preset speed, high-low trip lever 14 is moved upwardly momentarily, which drains the chamber to the right of piston 132 through port 265 and allows piston 132 to make the complete cycle and produce the gear changes commensurate with the preset speed setting of handwheel 15.

A suitable pressure relief valve 287 may be disposed at any suitable point in the hydraulic circuit. Valve 287 is shown in Fig. 4 as being disposed between pump line 44 and cascade line 91, and provides oil to cascade 92 when fluid is not flowing through the hydraulic circuit.

Various modes of carrying out the invention are contemplated as being within the scope of the following claims particularly pointing out and distinctly claiming the subject matter which is regarded as the invention.

I claim:

1. In a headstock for lathes and the like, a spindle, a source of power, a plurality of transmission gears for driving said spindle at selectively different speeds from said source of power, a fluid supply reservoir, a pressure pump for said fluid, a fluid pressure actuated spindle brake, a fluid pressure actuated clutch connected between said source of power and said spindle; a control valve for selectively conducting fluid under constant pressure from said pump to said brake and said clutch and with said control valve having a neutral and a drive position, said valve normally providing engagement of the brake and disengagement of the clutch when the valve is in neutral position, and said valve normally providing disengagement of the brake and engagement of the clutch when the valve is in a drive position; fluid pressure actuated distributor means operable to produce an hydraulic cycle for shifting said transmission gears to change the spindle speed, and pilot means connected to said fluid distributor means and said control valve and with said pilot means having a normal position whereby fluid is supplied from said pump to said control valve, said pilot means having a second position whereby fluid flow from said pump to said control valve is prevented and fluid between the control valve and clutch is drained to thereby disengage the clutch, actuation of said fluid distributor means affecting actuation of said pilot means to move the latter from said normal to said second position during a portion of the gear change cycle to thereby provide disengagement of said clutch when said control valve is in a drive position.

2. In a headstock for lathes and the like, a spindle, a source of power, a plurality of transmission gears for driving said spindle at selectively different speeds from said source of power, a fluid supply reservoir, a pressure pump for said fluid, a fluid pressure actuated clutch connected between said source of power and said spindle and providing the normal operating connection therebetween, fluid pressure actuated distributor means operable to produce an hydraulic cycle for shifting said transmission gears to change the spindle speed, gear shifting means actuated by operation of said distributor means during said cycle, and means actuated by operation of said distributor means during a cycle to provide a reduced drag pressure on said clutch so that said transmission gears will rotate slowly during shifting thereof and will mesh properly.

3. In a headstock for lathes and the like, a spindle, a source of power, a pair of meshing gears for driving said spindle from said source of power, means to shift one of said gears out of mesh with the other gear, a fluid supply reservoir, a pressure pump for said fluid, a fluid pressure actuated spindle brake, a fluid pressure actuated clutch connected between said source of power and said spindle, control means for selectively conducting fluid from said pump to said brake and said clutch and with said control means having a neutral position and a spindle drive position, said control means providing engagement of the brake and disengagement of the clutch when the control means is in a neutral position, and manually operable means connected to said control means to disengage said brake when said control means is in neutral position and to actuate said shifting means to free the spindle and permit manual turning thereof.

4. In a headstock for lathes and the like, a spindle, a source of power, a gear mounted on said spindle, a transmission gear unit normally in meshing relationship with said spindle gear and adapted to drive the spindle at selectively different speeds from said source of power, a fluid supply reservoir, a pressure pump for said fluid, a fluid pressure actuated spindle brake, a fluid pressure actuated clutch connected between said source of power and said spindle, fluid pressure actuated shifting means to shift said transmission gear unit to change the spindle speed, control means for selectively conducting fluid from said pump to said brake and said clutch and with said control means having a neutral position and a spindle drive position, said control means providing engagement of the brake and disengagement of the clutch when the control means is in neutral position, fluid pressure actuated lost motion means connected to said shifting means to shift said transmission gear unit out of mesh with said spindle gear, and manually operable means connected to said control means to disengage said brake when said control means is in neutral position and to simultaneously actuate said lost motion means to free the spindle and permit manual turning thereof.

5. In a headstock for lathes and the like, a spindle, a source of power, a gear mounted on said spindle, a transmission gear unit normally in meshing relationship with said spindle gear and adapted to drive the spindle at selectively different speeds from said source of power, a fluid supply reservoir, a pressure pump for said fluid, a fluid pressure actuated spindle brake, a fluid pressure actuated clutch connected between said source of power and said spindle, fluid pressure actuated shifting means to shift said transmission gear unit to change the spindle speed, control means for selectively conducting fluid from said pump to said brake and said clutch and with said control means having a neutral position and a spindle drive position, said control means providing engagement of the brake and disengagement of the clutch when the control means is in neutral position, said control means providing disengagement of the brake and engagement of the clutch when the control means is in a drive position, fluid pressure actuated lost motion means connected to said shifting means to shift said transmission gear unit out of mesh with said spindle gear, manually operable means connected to said control means to disengage said brake when said control means is in neutral position and to simultaneously actuate said lost motion means to free the spindle and permit manual turning thereof, and means actuated by said manually operable means to lock said control means in neutral position during the free spindle operation.

6. In a headstock for lathes and the like, a spindle, a source of power, a plurality of transmission gears for driving said spindle at selectively different speeds from said source of power, a fluid supply reservoir, a pressure pump for said fluid, a fluid pressure actuated spindle brake, a fluid pressure actuated clutch connected between said source of power and said spindle; a control valve for selectively conducting fluid under constant pressure from said pump to said brake and said clutch with said control valve having a neutral and a drive position, said valve normally providing engagement of the brake and disengagement of the clutch when the valve is in neutral position, and said valve normally providing disengagement of the brake and engagement of the clutch when the valve is in a drive position; fluid pressure actuated distributor means operable to produce a hydraulic cycle for shifting said transmission gears to change the spindle speed, and a brake pilot valve connected between said control valve and said brake and actuated by said fluid distributor means during said cycle to supply pressure fluid to said brake to engage the latter when said control valve is in a drive position to slow down said spindle.

7. In a headstock for lathes and the like, a spindle, a source of power, a plurality of transmission gears for driving said spindle at selectively different speeds from said source of power, a fluid supply reservoir, a pressure pump for said fluid, a fluid pressure actuated spindle brake, a fluid pressure actuated clutch connected between said source of power and said spindle; a control valve for selectively conducting fluid under constant pressure from said pump to said brake and said clutch with said control valve having a neutral and a drive position, said valve normally providing engagement of the brake and disengagement of the clutch when the valve is in neutral position, and said valve normally providing disengagement of the brake and engagement of the clutch when the valve is in a drive position; fluid pressure actuated distributor means operable to produce a hydraulic cycle for shifting said transmission gears to change the spindle speed, a brake pilot valve connected between said control valve and said brake and actuated by said fluid distributor means during said cycle to supply pressure fluid to said brake to engage the latter when said control valve is in a drive position to slow down said spindle, and pilot means connected to said fluid distributor means and said control valve and with said pilot means having a normal position whereby fluid is supplied from said pump to said control valve, said pilot means having a second position whereby fluid flow from said pump to said control valve is prevented and fluid between the control valve and clutch is drained to thereby disengage the clutch, actuation of said fluid distributor means affecting actuation of said pilot means to move the latter from said normal to said second position during a portion of the gear change cycle to thereby provide disengagement of said clutch when said control valve is in a drive position.

8. In a headstock for lathes and the like having a spindle and a drive therefor, a fluid supply reservoir, a pressure pump for said fluid, a fluid pressure actuated spindle brake, a fluid pressure actuated clutch connected to said drive; a control valve for selectively conducting fluid from said pump to said brake and said clutch and with said control valve having a neutral position and a spindle drive position, said valve providing engagement of the brake and disengagement of the clutch when the valve is in a neutral position, and said valve providing disengagement of the brake and engagement of the clutch when the valve is in a drive position; and means operable to disengage said brake and engage said clutch when said valve is in neutral position to provide an inching movement of the spindle.

9. In a headstock for lathes and the like having a spindle and a drive therefor, a fluid supply reservoir, a pressure pump for said fluid, a fluid pressure actuated spindle brake, a fluid pressure actuated clutch connected to said drive; a control valve for selectively conducting fluid under constant pressure from said pump to said brake and said clutch and with said control valve having a neutral position and a spindle drive position, said valve providing engagement of the brake and disengagement of the clutch when the valve is in neutral position, and said valve providing disengagement of the brake and engagement of the clutch when the valve is in a position other than neutral; and means operable to disengage said brake and supply a reduced regulated drag pressure to said clutch when said valve is in neutral position to provide an inching movement of the spindle.

10. The apparatus of claim 9 in which said means comprises a manually operable hydraulic inching valve connected between said control valve and said brake and clutch; said inching valve normally being open between said control valve and said brake when the former is in neutral position so that the brake will be engaged, actuation of said inching valve disconnecting fluid between the control valve and the brake and opening the brake line to drain to release the brake, actuation of said inching valve also providing a flow of fluid between said control valve and said clutch; and means in connection with said inching valve to drain off a regulated portion of said last named fluid to reduce the pressure of the fluid incident on said clutch.

11. In a headstock for lathes and the like having a rotary spindle and a drive therefor, a fluid supply reservoir, a pressure pump for said fluid, a fluid pressure actuated spindle brake, a fluid pressure actuated spindle clutch connected to said drive, hydraulic means positionable in neutral to engage said brake and disengage said clutch when the spindle is stopped, and hydraulic means operable to disengage said brake and engage said clutch when said first named means is in neutral position to provide an inching movement of the spindle.

12. In a headstock for lathes and the like having a rotary spindle and a drive therefor, a fluid supply reservoir, a pressure pump for said fluid, a fluid pressure actuated spindle brake, a fluid pressure actuated spindle clutch connected to said drive, hydraulic means positionable in neutral to engage said brake and disengage said clutch when the spindle is stopped, and hydraulic means operable to disengage said brake and supply a reduced regulated drag pressure to said clutch when said first named means is in neutral position to provide a slow inching movement of the spindle.

13. In a headstock for lathes and the like, a spindle, a source of power, means for rotatably driving said spindle at selectively different high and low speeds from said source of power, a fluid supply reservoir, a pressure pump for said fluid, a fluid pressure actuated spindle brake, fluid actuated forward and reverse clutches connected between said source of power and said spindle; a control valve for selectively conducting fluid from said pump to said brake and said clutches, said control valve having a neutral position and forward and reverse spindle drive positions; a governor mounted within said headstock for simultaneous rotation with said spindle, and fluid pressure actuated means controlled by said governor for preventing movement of said control valve from one drive position to another when the spindle is rotating at high speeds.

14. The apparatus of claim 13 in which said control valve comprises a housing having a valve stem movable therein to a plurality of positions and with the valve stem extending outwardly of the housing, and said means comprises a latch member disposed adjacent the outer portion of said valve stem and hydraulically actuated by said governor to prevent outward movement of said valve stem at high spindle speeds.

15. In a headstock for lathes and the like, a spindle, a source of power, a plurality of transmission gears for driving said spindle at selectively different high and low speeds from said source of power, a fluid supply reservoir, a pressure pump for said fluid, fluid actuated high and low speed clutches connected between said source of power and said spindle with engagement of one of said clutches providing a corresponding high or low speed of spindle rotation, fluid pressure actuated distributor means operable to produce an hydraulic cycle whereby shifting of said transmission gears is produced, gear shifting means actuated by operation of said distributor means during said cycle, manually positionable cam means disposed between said distributor means and said gear shifting means to selectively supply fluid from the former to the latter during said cycle, and means connected between said clutches and said pump to supply fluid to said clutches, said last named means being operable by said distributor means during a cycle and by said cam means to supply fluid selectively to either said high or low clutch to engage the same.

16. In a headstock for lathes and the like, a spindle, a source of power, means for driving said spindle from said source of power, a fluid supply reservoir, a pressure pump for said fluid, fluid actuated high and low speed clutches connected between said source of power and said spindle with engagement of one of said clutches providing a corresponding high or low speed of spindle rotation, fluid pressure actuated distributor means operable to produce an hydraulic cycle whereby the spindle speed is changed, manually positionable cam means connected to said distributor means, and means connected between said clutches and said pump to supply fluid to said clutches, said last named means being actuated by said distributor means and said cam means to supply fluid selectively to either said high or low clutch to engage the same.

17. In a headstock for lathes and the like, a spindle, a source of power, means for driving said spindle from said source of power, a fluid supply reservoir, a pressure pump for said fluid, a fluid pressure actuated spindle brake, fluid pressure actuated high and low speed clutches connected between said source of power and said spindle with engagement of one of said clutches providing a corresponding high or low speed of spindle rotation, fluid pressure actuated distributor means operable to produce an hydraulic cycle whereby the spindle speed is changed and with said cycle including application of said brake to said spindle, valve means connected between said clutches and said pump and being operable by said distributor means to supply fluid to either said high or low clutch to selectively engage the same, and means disposed between said pump and said valve means and actuated by said distributor means during a cycle to prevent the flow of fluid to the selectively engaged clutch while the brake is engaged.

18. In a headstock for lathes and the like, a spindle, a source of power, means for driving said spindle from said source of power, a fluid supply reservoir, a pressure pump for said fluid, a fluid pressure actuated spindle brake, fluid pressure actuated high and low speed clutches connected between said source of power and said spindle with engagement of one of said clutches providing a corresponding high or low speed of spindle rotation, fluid pressure actuated distributor means operable to produce an hydraulic cycle whereby the spindle speed is changed and with said cycle including application of said brake to said spindle, gear shifting means actuated by operation of said distributor means during said cycle, manually positionable cam means disposed between said distributor means and said gear shifting means to selectively supply fluid from the former to the latter during said cycle, valve means connected between said clutches and said pump and being operable by said distributor means and said cam means to supply fluid to either said high or low clutch to selectively engage the same, and means disposed between said pump and said valve means and actuated by said distributor means during a cycle to prevent the flow of fluid to the selectively engaged clutch while the brake is engaged.

19. In a headstock for lathes and the like, a spindle, a source of power, means for driving said spindle from said source of power, a fluid supply reservoir, a pressure pump for said fluid, a fluid pressure actuated brake operable to slow said spindle, fluid actuated high and low speed clutches connected between said source of power and said spindle with engagement of one of said clutches providing a corresponding high or low speed of spindle rotation, fluid pressure actuated distributor means operable to produce an hydraulic cycle whereby the spindle speed is changed, manually operable means to initiate the operation of said distributor means to change the desired spindle speed, said cycle including slowing of the spindle by actuation of said brake thereto and disengagement of the high clutch and engagement of the low clutch when it is desired to shift from a high spindle speed to another speed, a governor mounted within the headstock and rotatable with said spindle, and fluid pressure actuated means responsive to the rotational speed of said governor to delay the operation of said distributor means when a shift from a high spindle speed is desired to prevent engagement of said low clutch until said spindle has slowed down to a predetermined low speed.

20. In a headstock for lathes and the like, a spindle, a source of power, a plurality of transmission gears for driving said spindle at selectively different speeds from said source of power, a fluid supply reservoir, a pressure pump for said fluid, a fluid pressure actuated brake operable to slow said spindle, fluid actuated high and low speed clutches connected between said source of power and said spindle with engagement of one of said clutches providing a corresponding high or low speed of spindle rotation, fluid pressure actuated distributor means operable to produce an hydraulic cycle whereby shifting of said transmission gears is produced, said cycle including slowing of said spindle by actuation of said brake thereto and disengagement of the high clutch and engagement of the low clutch, a governor mounted within the headstock and rotatable with said spindle, and fluid pressure actuated means responsive to the rotational speed of said governor to delay a portion of the operation of said distributor means to prevent engagement of said low clutch until said spindle has slowed down to a predetermined low speed.

21. In a headstock for lathes and the like, a spindle, a source of power, means for driving said spindle from said source of power, a fluid supply reservoir, a pressure pump for said fluid, a fluid pressure actuated brake operable to slow said spindle, fluid actuated high and low speed clutches connected between said source of power and said spindle with engagement of one of said clutches providing a corresponding high or low speed of spindle rotation, fluid pressure actuated distributor means operable to produce an hydraulic cycle whereby the spindle speed is changed from a high to a low speed, said cycle including slowing of the spindle by actuation of said brake thereto and disengagement of the high clutch and engagement of the low clutch, a governor mounted within the headstock and rotatable with said spindle, and fluid pressure actuated means responsive to the rotational speed of the governor to delay a portion of the operation of said distributor means to prevent engagement of said low clutch until said spindle has slowed down to a predetermined low speed.

22. In a headstock for lathes and the like, a spindle, a source of power, a plurality of transmission gear members for driving said spindle at selectively different speeds from said source of power, a fluid supply reservoir, a pressure pump for said fluid, a fluid pressure actuated spindle brake, fluid pressure actuated high and low speed clutches connected between said source of power and said spindle with engagement of one of said clutches providing a corresponding high or low speed of spindle rotation, a gear shifter unit disposed in engagement with each transmission gear member and actuated by fluid pressure to shift the corresponding gear member to change the spindle speed, a fluid pressure operated distributor valve disposed between said pump and said gear shifter units with said valve having a piston adapted to reciprocate therein to produce an hydraulic cycle whereby said gear shifter units are actuated, means responsive to the cycling position of said valve piston to disengage said high clutch and engage said brake when a change from a given high speed to another speed is desired, a governor mounted within the headstock and rotatable with said spindle, a pilot valve disposed between said pump and said distributor valve with said pilot valve being responsive to the rotational speed of said governor and operable by said distributor valve when said piston is at a given position to delay a portion of the operation of said piston after said brake has been applied until said spindle has slowed to a predetermined low speed, and means disposed between said pump and said distributor valve to prevent the flow of fluid to said gear shifter units until said piston has reached said given position in the cycle to prevent a gear change until said spindle has reached a low speed of rotation.

23. In a headstock for lathes and the like, a spindle, a source of power, a plurality of transmission gears for driving said spindle at selectively different speeds from said source of power, a fluid supply reservoir, a pressure pump for said fluid, a fluid pressure actuated clutch connected between said source of power and said spindle, fluid pressure actuated distributor means operable to produce an hydraulic cycle for shifting said transmission gears to change the spindle speed, gear shifting means actuated by operation of said distributor means during said cycle; and means actuated by operation of said distributor means during a cycle to provide a reduced drag pressure on said clutch so that said transmission gears will rotate slowly during shifting thereof and will mesh properly, said distributor actuated means comprising, a pilot valve disposed between said pump and said clutch and normally open therebetween, and a pressure regulating valve providing a by-pass for said pilot valve when the latter is actuated by operation of said distributor means, said pressure regulating valve bleeding off a regulated amount of fluid so that the fluid incident on the clutch is at a reduced pressure.

References Cited in the file of this patent

UNITED STATES PATENTS

| | | |
|---|---|---|
| 2,782,651 | Sassen et al. | Feb. 26, 1957 |
| 2,782,891 | Sassen | Feb. 26, 1957 |